United States Patent
Suzuki et al.

(10) Patent No.: US 11,343,408 B2
(45) Date of Patent: May 24, 2022

(54) TERMINAL AND NON-TRANSITORY COMPUTER READABLE MEDIUM FOR TRANSMITTING FIRST IDENTIFICATION INFORMATION IN PLACE OF SECOND IDENTIFICATION INFORMATION

(71) Applicant: FUJIFILM Business Innovation Corp., Tokyo (JP)

(72) Inventors: Takayuki Suzuki, Kanagawa (JP); Ryoji Matsumura, Kanagawa (JP); Taishi Asumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 165 days.

(21) Appl. No.: 16/516,247

(22) Filed: Jul. 18, 2019

(65) Prior Publication Data

US 2020/0036864 A1 Jan. 30, 2020

(30) Foreign Application Priority Data

Jul. 27, 2018 (JP) .............................. JP2018-141139

(51) Int. Cl.

| H04B 7/14 | (2006.01) |
|---|---|
| H04L 67/00 | (2022.01) |
| H04L 29/06 | (2006.01) |
| H04N 1/44 | (2006.01) |
| H04L 67/01 | (2022.01) |
| H04B 7/15 | (2006.01) |

(Continued)

(52) U.S. Cl.
CPC ............ *H04N 1/4433* (2013.01); *H04B 7/15* (2013.01); *H04L 67/02* (2013.01); *H04L 67/42* (2013.01); *H04N 1/0097* (2013.01); *H04N 1/00244* (2013.01); *H04N 1/4426* (2013.01)

(58) Field of Classification Search
USPC ....... 358/1.1–3.29, 1.11–1.18; 713/155–185; 715/740–743; 726/1–31
See application file for complete search history.

(56) References Cited

U.S. PATENT DOCUMENTS 8,958,090 B2 2/2015 Tanaka
9,853,977 B1 * 12/2017 Laucius ................. H04L 9/321
(Continued)

FOREIGN PATENT DOCUMENTS

| JP | 2013132892 | 7/2013 |
| JP | 2014-127127 | 7/2014 |
| JP | 2015-228178 | 12/2015 |

OTHER PUBLICATIONS

"Office Action of Japan Counterpart Application", dated Mar. 29, 2022, with English translation thereof, p. 1-p. 5.

*Primary Examiner* — Marcellus J Augustin
(74) *Attorney, Agent, or Firm* — JCIPRNET

(57) ABSTRACT

A terminal includes a relay unit, a memory, and an access unit. The relay unit relays communication between a different terminal and a server that requires two-step authentication at a time of providing a service. The memory stores first identification information for identifying the different terminal. The access unit accesses the server. In a case where data to be transmitted to the server includes second identification information for identifying the terminal, the access unit transmits the first identification information, in place of the second identification information included in the data, to the server.

5 Claims, 7 Drawing Sheets

(51) Int. Cl.
*H04N 1/00* (2006.01)
*H04L 67/02* (2022.01)

(56) References Cited

U.S. PATENT DOCUMENTS

| | | | |
|---|---|---|---|
| 11,206,533 B2* | 12/2021 | Savolainen | H04L 63/0807 |
| 2010/0251352 A1* | 9/2010 | Zarchy | G06F 21/10 |
| | | | 726/9 |
| 2017/0346804 A1* | 11/2017 | Beecham | H04L 63/083 |
| 2018/0124050 A1* | 5/2018 | Sakamoto | H04W 48/08 |
| 2019/0036933 A1* | 1/2019 | Pitchaimani | H04L 67/146 |
| 2019/0089693 A1* | 3/2019 | Ding | H04L 63/0807 |

* cited by examiner

TERMINAL AND NON-TRANSITORY COMPUTER READABLE MEDIUM FOR TRANSMITTING FIRST IDENTIFICATION INFORMATION IN PLACE OF SECOND IDENTIFICATION INFORMATION

CROSS-REFERENCE TO RELATED APPLICATIONS

This application is based on and claims priority under 35 USC 119 from Japanese Patent Application No. 2018-141139 filed Jul. 27, 2018.

BACKGROUND

(i) Technical Field

The present disclosure relates to a terminal and a non-transitory computer readable medium.

(ii) Related Art

In Japanese Unexamined Patent Application Publication No. 2014-127127, an apparatus is described that includes a plurality of pieces of conversion request holding means for holding a conversion request for data conversion from a certain data format into another data format for each type of the data conversion, and a plurality of pieces of conversion means capable of executing a plurality of types of the data conversion or more. Based on conversion requests held by a plurality of pieces of associated conversion request holding means among the plurality of pieces of conversion request holding means, the plurality of pieces of conversion means perform the data conversion of types corresponding to the conversion request holding means. Furthermore, in Japanese Unexamined Patent Application Publication No. 2013-132892, as a technique for allowing an image forming apparatus that is not registered in advance with a printing service system to perform printing via the system, an image forming apparatus is described that registers the image forming apparatus with a printing service system by performing user authentication and transmitting a registration request including user information and information on the image forming apparatus.

Furthermore, in Japanese Unexamined Patent Application Publication No. 2015-228178, as a technique for improving user friendliness for simultaneous use of cloud printing and local printing, a system is described that includes display means for displaying a printing screen that receives input regarding execution of a print job in a first printing mode for issuing a printing instruction via a printing service and a second printing mode for issuing a printing instruction not via a printing service, and control means for performing control such that a print job is transferred to an image forming apparatus through a path corresponding to the input received through the printing screen displayed by the display means. The display means displays the printing screen as the second printing mode including a third printing mode for receiving printing settings for an image forming apparatus selected from among image forming apparatuses found by search and then issuing a printing instruction, and a fourth printing mode for issuing a printing instruction without receiving printing settings for a connected image forming apparatus.

SUMMARY

Aspects of non-limiting embodiments of the present disclosure relate to reducing processing load regarding two-step authentication for a case where a user accesses a service using a plurality of terminals.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a terminal including a relay unit, a memory, and an access unit. The relay unit relays communication between a different terminal and a server that requires two-step authentication at a time of providing a service. The memory stores first identification information for identifying the different terminal. The access unit accesses the server. In a case where data to be transmitted to the server includes second identification information for identifying the terminal, the access unit transmits the first identification information, in place of the second identification information included in the data, to the server.

BRIEF DESCRIPTION OF THE DRAWINGS

Exemplary embodiments of the present disclosure will be described in detail based on the following figures, wherein.

DETAILED DESCRIPTION

1. Configuration

Figure 1:
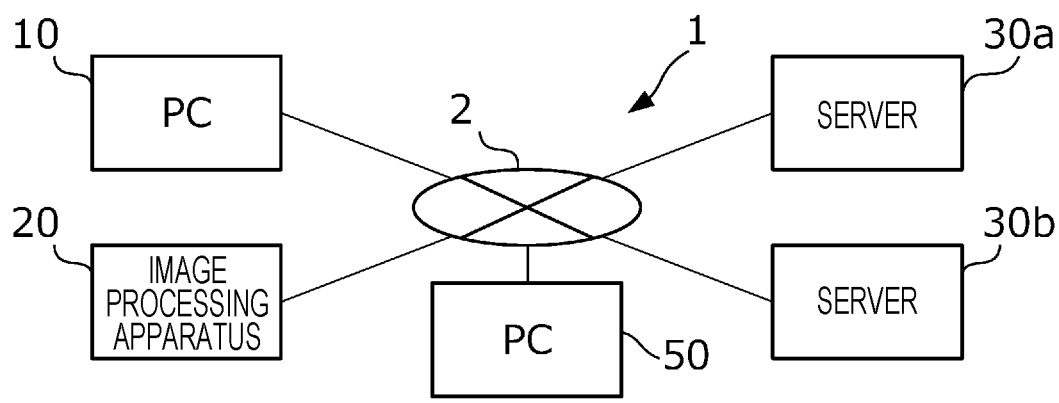
FIG. 1 is a block diagram illustrating an example of the configuration of an information processing system.

FIG. 1 is a block diagram illustrating an example of the configuration of an information processing system 1 according to an exemplary embodiment. The information processing system 1 includes a personal computer (hereinafter, "PC") 10, an image processing apparatus 20, a server 30*a*, a server 30*b*, and a PC 50. The PC 10 is, for example, a terminal such as a desktop computer, a laptop computer, a smartphone, a mobile phone, a tablet computer, or the like. The PC 10 uses a service provided by the server 30*a* or the server 30*b*.

The image processing apparatus 20 performs image processing such as image forming processing for forming an image on a medium such as paper and image reading processing for reading an image formed on a medium such as an original. The image processing apparatus 20 is installed at a store or an office and is shared among multiple users. The image processing apparatus 20 transmits a scanned document to a cloud service and acquires printing data from cloud (pull-printing).

The server 30a is a server that provides a storage service. The server 30b is a server that provides various services such as a cloud printing service. The cloud printing service is a printing service provided through a communication line 2. The cloud printing service provided by the server 30b requires user authentication. In this exemplary embodiment, the server 30b performs two-step authentication. In this exemplary embodiment, two-step authentication represents a mechanism for achieving safer user authentication by performing authentication based on an ID and a password (first authentication) and another authentication based on security code or the like (second authentication). The server 30b includes a "skip function" of skipping two-step authentication for access by an access source. After user authentication is successfully completed, a user is able to select whether or not to validate the skip function. For authentication of the server 30a or the server 30b, for example, a protocol such as OAuth 2.0 or OpenID Connect is used. Authentication is performed via, for example, a PC browser. In the explanation provided below, in the case where there is no need to distinguish between the server 30a and the server 30b, these servers will be referred to as "servers 30".

The PC 50 is, for example, a device such as a desktop computer, a laptop computer, a smartphone, a mobile phone, or a tablet computer. In this exemplary embodiment, the PC 50 is used for two-step authentication.

The PC 10 and the image processing apparatus 20 (examples of a terminal in the present disclosure) are client terminals that access services provided by the server 30a and the server 30b. Both the PC 10 and the image processing apparatus 20 may be used by a single user. In this exemplary embodiment, one of the PC 10 and the image processing apparatus 20 includes a proxy function, and the other one of the PC 10 and the image processing apparatus 20 accesses the server 30a and the server 30b via the client terminal that includes the proxy function.

The PC 10, the image processing apparatus 20, and the PC 50 are connected to the server 30a and the server 30b by the communication line 2. For example, the communication line 2 includes at least one of the Internet, a mobile communication network, a telephone line, a local area network (LAN), and the like.

Figure 2:
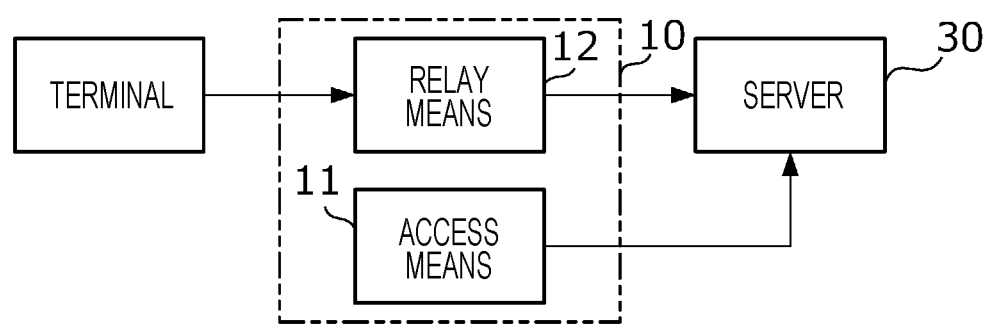
FIG. 2 is a block diagram illustrating an example of the functional configuration of a personal computer (PC)

FIG. 2 is a block diagram illustrating an example of the functional configuration of the PC 10 according to this exemplary embodiment (an example of a terminal according to the present disclosure). The PC 10 includes access means 11 and relay means 12. The access means 11 accesses the server 30 that requires two-step authentication for provision of a service. The relay means 12 relays communication between a different terminal and the server 30. In the case where data received from the different terminal includes first identification information for identifying the different terminal, the relay means 12 transmits second identification information for identifying the PC 10, in place of the first identification information included in the data.

Figure 3:
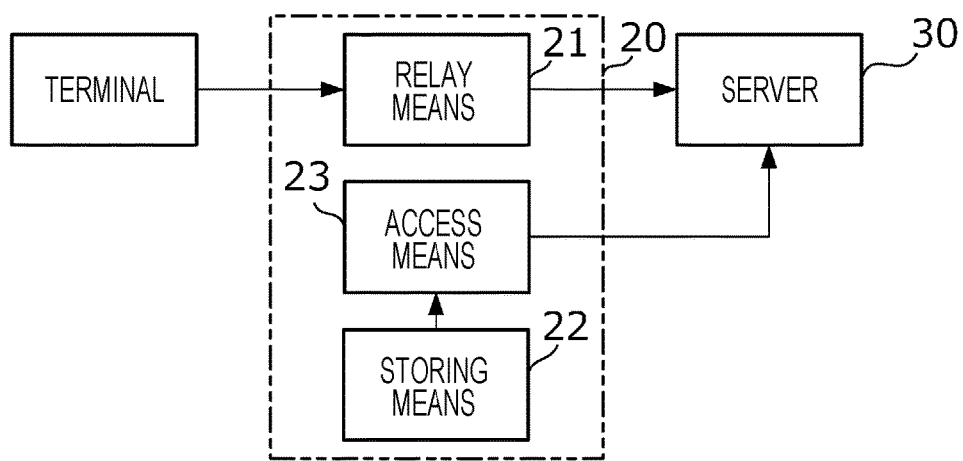
FIG. 3 is a block diagram illustrating an example of the functional configuration of an image processing apparatus.

FIG. 3 is a block diagram illustrating an example of the functional configuration of the image processing apparatus 20 (an example of a terminal according to the present disclosure). The image processing apparatus 20 includes relay means 21, storing means 22, and access means 23. The relay means 21 is a relay unit that relays communication between a different terminal and the server 30 that requires two-step authentication for provision of a service. The storing means 22 is a memory that stores first identification information for identifying a different terminal. The access means 23 is an access unit that accesses the server 30. In the case where data to be transmitted to the server 30 includes second identification information for identifying the image processing apparatus 20, the access means 23 transmits the first identification information, in place of the second identification information included in the data, to the server 30.

Figure 4:
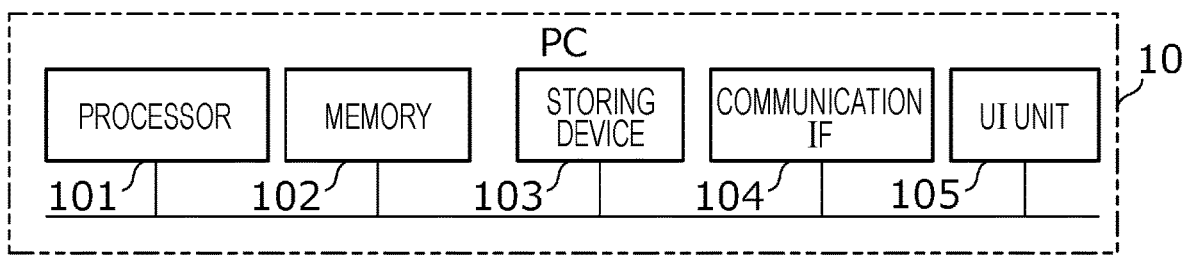
FIG. 4 is a block diagram illustrating an example of the hardware configuration of the PC.

FIG. 4 is a diagram illustrating an example of the hardware configuration of the PC 10. A processor 101 controls other elements of the PC 10. A memory 102 is a memory device that functions as a work area used by the processor 101 to execute a program. The memory 102 includes, for example, a random access memory (RAM). A storing device 103 stores various programs and data. The storing device 103 includes, for example, a solid state drive (SSD) or a hard disk drive (HDD). A communication IF 104 communicates with other apparatuses in accordance with predetermined wireless or wired communication standards (for example, Wi-Fi®, Bluetooth®, or Ethernet®. A UI unit 105 includes, for example, a touch screen and keys. The UI unit 105 may be built in the PC 10 or may be an external unit that is externally connected.

In this example, when the processor 101 executes a program stored in the memory 102 or the storing device 103, the functions illustrated in FIG. 2 are implemented. The processor 101 that executes a program is an example of the access means 11 and the relay means 12.

Figure 5:
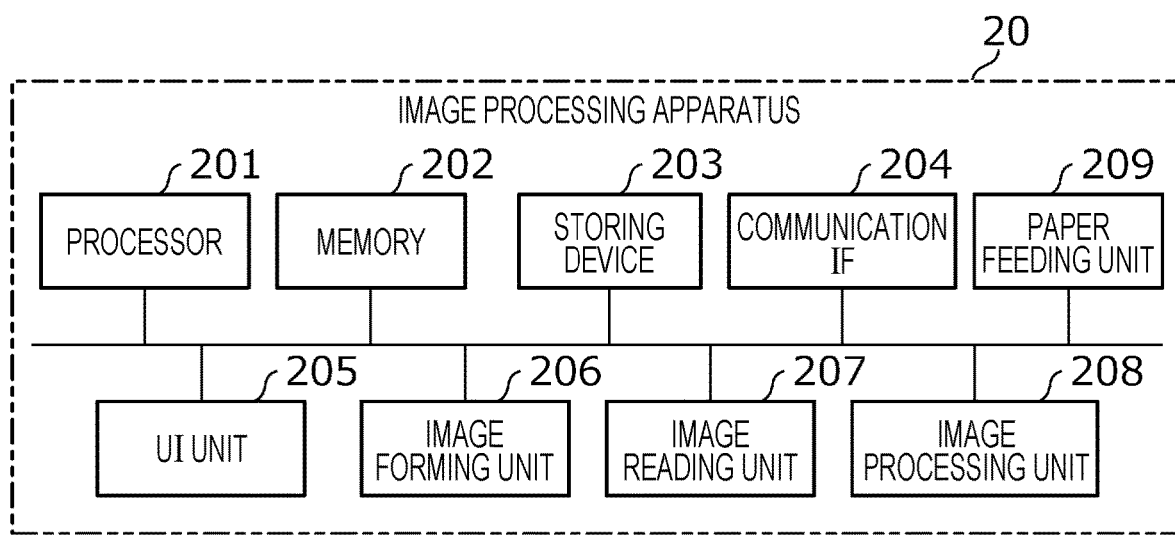
FIG. 5 is a block diagram illustrating an example of the hardware configuration of the image processing apparatus.

FIG. 5 is a diagram illustrating an example of the hardware configuration of the image processing apparatus 20. A processor 201 controls other elements of the image processing apparatus 20. A memory 202 is a memory device that functions as a work area used by the processor 201 to execute a program. The memory 202 includes, for example, a RAM. A storing device 203 stores various programs and data. The storing device 203 includes, for example, an SSD or an HDD. A communication IF 204 communicates with other apparatuses in accordance with predetermined wireless or wired communication standards (for example, Wi-Fi, Bluetooth, or Ethernet.

A UI unit 205 includes, for example, a touch screen and keys. The UI unit 205 may be built in the image processing apparatus 20 or may be an external unit that is externally connected. An image forming unit 206 forms an image on a medium such as paper using an electrophotographic system. An image reading unit 207 optically reads an image on an original (medium). An image processing unit 208 includes, for example, a digital signal processor (DSP) and a graphics processing unit (GPU), and performs various types of image processing. A paper feeding unit 209 supplies a medium such as paper to the image forming unit 206.

In this example, when the processor 201 executes a program stored in the memory 202 or the storing device 203, the functions illustrated in FIG. 3 are implemented. The processor 201 that executes a program is an example of the relay means 21 and the access means 23. The storing device 203 is an example of the storing means 22.

Figure 6:
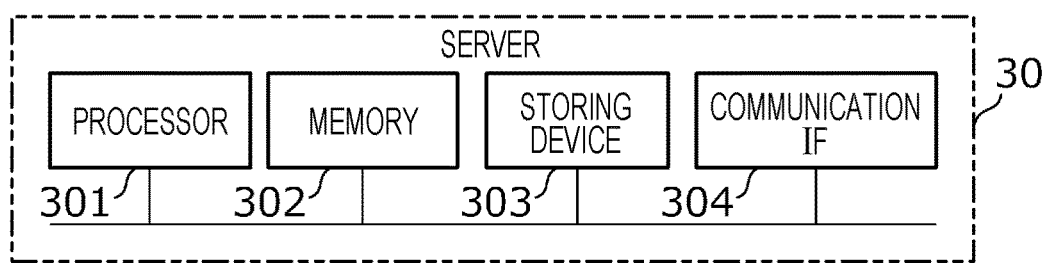
FIG. 6 is a block diagram illustrating an example of the hardware configuration of a server.

FIG. 6 is a diagram illustrating an example of the hardware configuration of the server 30. A processor 301 controls other elements of the server 30. A memory 302 is a memory device that functions as a work are used by the processor 301 to execute a program. The memory 302 includes, for example, a RAM. A storing device 303 stores various programs and data. The storing device 303 includes, for example, an SSD or an HDD. A communication IF 304 communicates with other apparatuses in accordance with predetermined wireless or wired communication standards.

2. Operation

In this exemplary embodiment, one of client terminals (one of the PC 10 and the image processing apparatus 20) is provided with a proxy function, and the other client terminal accesses a cloud printing service via the client terminal having the proxy function. In the case where the PC 10 is provided with the proxy function, software for implementing the proxy function needs to be installed in advance in the PC 10. Furthermore, access by the PC 10 needs to be viewable from a service to be provided, regardless of which one of the client terminals operates as a proxy. This is because the image processing apparatus 20 is an apparatus that is shared among multiple users and it is not desirable to skip the Internet protocol (IP) address of the image processing apparatus 20 as a skip target for two-step authentication.

2-1. First Operation Example (Case where Image Processing Apparatus 20 Operates as Proxy)

First, operation in the case where the image processing apparatus 20 has a proxy function and the image processing apparatus 20 relays communication between the PC 10 and the server 30 will be described. In this case, proxy setting needs to be performed in advance on the browser of the PC 10.

In this operation example, a case where pull-printing is performed will be explained. Pull-printing is performed in the order of procedures (i) and (ii). In the procedure (i), a user issues, using the PC 10, a printing instruction to a printing service (server 30) on cloud. Before receiving the printing request, the server 30 performs user authentication (two-step authentication) for the printing service. Then, in the procedure (ii), the user accesses, using the image processing apparatus 20, the printing service to make a request for printing execution for the registered printing instruction. Before performing the printing processing, the server 30 performs user authentication (two-step authentication) for the printing service.

In the procedure (i) described above, the printing service (server 30) is accessed by the PC 10. In contrast, in the procedure (ii), the printing service (server 30) is accessed by the image processing apparatus 20. That is, in the procedures (i) and (ii), the server 30 is accessed by different client terminals by a single user.

2-1-1. Reception Operation for Printing Instruction

First, the user specifies, using the PC 10, the address of the Web UI of the server 30*a*, and makes a request for printing of a file registered in the server 30*a*.

Figure 7:
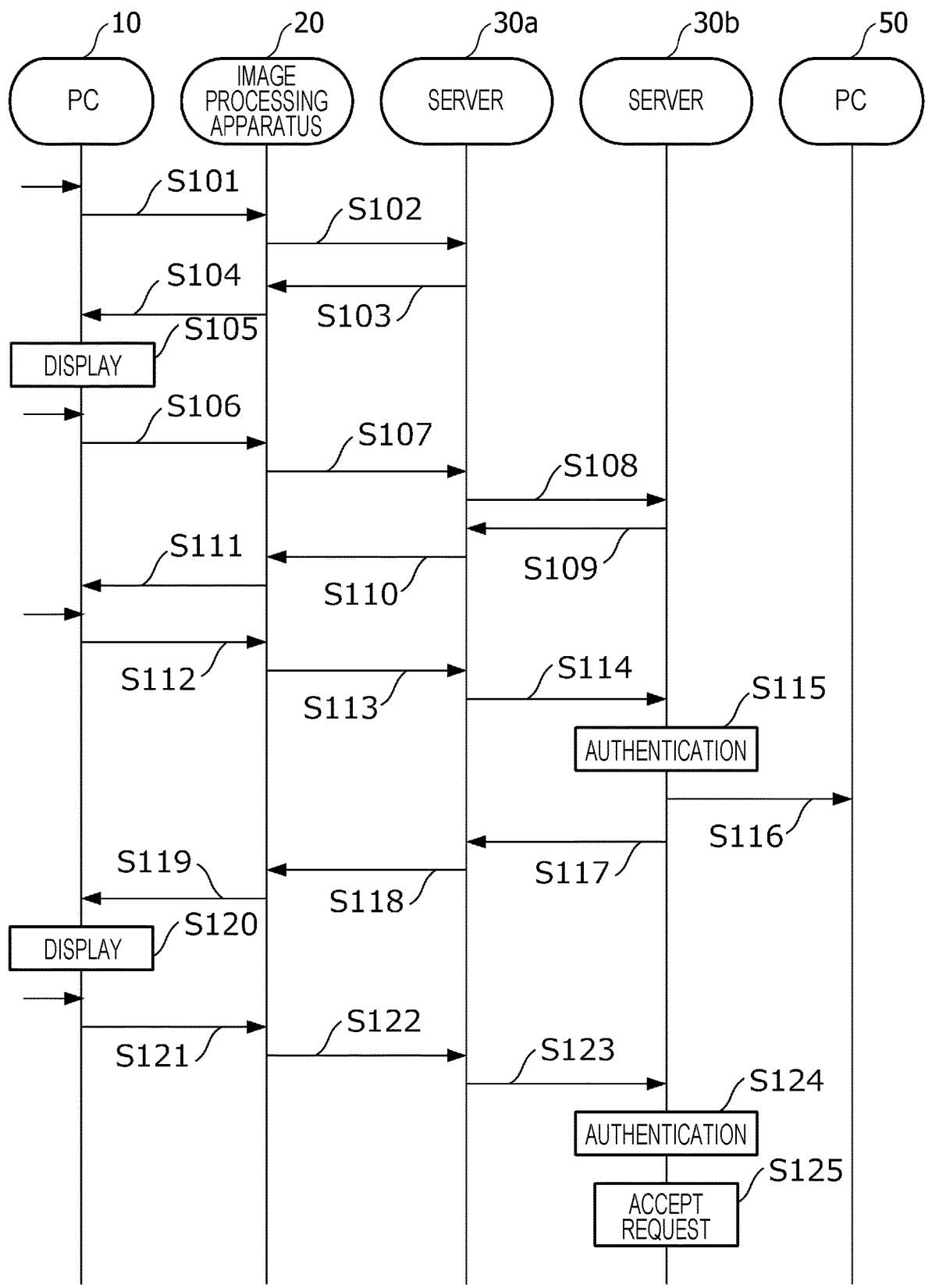
FIG. 7 is a sequence diagram illustrating an example of the flow of an operation of an information processing system.

FIG. 7 is a sequence diagram illustrating an example of the flow of an operation of the information processing system 1. In step S101, the PC 10 transmits a request regarding access to the server 30 using a specified address to the image processing apparatus 20. This request includes the IP address (an example of first identification information) of the PC 10.

In step S102, the image processing apparatus 20 relays the request received from the PC 10 to the server 30*a*. In step S103, the server 30*a* transmits a response including a list of files specified by a URL to the image processing apparatus 20. In step S104, the image processing apparatus 20 transmits the response received from the server 30*a* to the PC 10.

In step S105, the PC 10 displays the received list of files on the UI unit 105. A user performs, using the UI unit 105, an operation for specifying a file to be printed from the displayed list. When the user specifies a file, the PC 10 transmits a printing request including a file ID for identifying the specified file to the server 30*a* via the image processing apparatus 20 in steps S106 and S107. The image processing apparatus 20 relays communication from the PC 10 to the server 30*a*.

In step S108, the server 30*a* transmits the printing request to the server 30*b*. Upon receiving the printing request from the server 30*a*, the server 30*b* transmits a response regarding request for authentication of a transmission source of the printing request to the server 30*a* in step S109. In steps S110 and S111, the server 30*a* transmits a response regarding request for authentication of the PC 10 to the PC 10 via the image processing apparatus 20.

Upon receiving the response via the image processing apparatus 20, the PC 10 displays a screen prompting input of authentication information on the UI unit 105 in accordance with the received response. The user inputs authentication information (for example, a token and a password) using the UI unit 105. In this exemplary embodiment, a token represents a character string allocated to a user or a character string issued to a user. A token may be, for example, a character string that is temporarily usable, such as a one-time password or, for example, a user ID that is allocated in advance to a user.

In steps S112, S113, and S114, the PC 10 transmits a request including the input authentication information to the server 30*b* via the image processing apparatus 20 and the server 30*a*. Furthermore, at the time of relaying the request including the authentication information, the image processing apparatus 20 stores the ID token and the IP address of the PC 10 included in the request in association with each other in the storing device 203. Furthermore, at the time of relaying communication between the PC 10 and the server 30*b*, the image processing apparatus 20 performs processing for replacing secure sockets layer (SSL) connection for a specific URL (the URL of the server 30*a* or the server 30*b*).

In step S115, the server 30*b* performs user authentication using the authentication information included in the received request. The user authentication performed at this time is the first-step authentication of the two-step authentication.

In the case where the first-step authentication is successfully completed, the server 30*b* determines whether or not to skip the second-step authentication of the two-step authentication. This determination is performed based on whether or not multiple continuous accesses have been made by a client terminal as an access source identified by the received request. In the case where multiple continuous accesses to the server 30*b* have been made by a client terminal, the server 30*b* skips the second authentication of the two-step authentication. In contrast, in the case where access by the client terminal is for the first time, the server 30*b* determines that the second authentication of the two-step authentication needs to be performed. In this operation example, the determination as to whether or not multiple continuous accesses have been made is performed based on the IP address included in the request. In the case where the same IP address is included in requests, it is determined that client terminals as access sources are the same. In contrast, in the case where different IP addresses are included in requests, it is determined that client terminals as access sources are different.

In the example of FIG. 7, access to the server 30*b* by the PC 10 is for the first time (not continuous accesses), and it is thus determined that the second authentication of the two-step authentication needs to be performed. Therefore, the server 30*b* performs processing for the second authentication of the two-step authentication. That is, in step S116, the server 30*b* transmits a message (for example, a short message service (SMS)) including security code required for the two-step authentication to an address associated with the user ID. The transmitted message is received by the PC 50.

Furthermore, in steps S117, S118, and S119, the server 30b transmits a response regarding request for two-step-authentication to the PC 10 via the server 30a and the image processing apparatus 20. The image processing apparatus 20 relays communication between the server 30a and the PC 10.

Upon receiving the response, the PC 10 displays a screen prompting input of security code on the UI unit 105 in accordance with the received response in step S120. The user inputs, using the UI unit 105 of the PC 10, the security code displayed on the UI unit 105 of the PC 50.

After the security code is input, the PC 10 transmits a request including the input security code to the server 30b via the image processing apparatus 20 and the server 30a in steps S121, S122, and S123.

Upon receiving the request, the server 30b performs the second-step user authentication using the security code included in the received request in step S124. In the case where user authentication is successfully completed, the server 30b accepts the printing request received in step S108, and adds the received printing request to a processing list in step S125. As described above, two-step authentication is performed at the server 30b, and the printing instruction is accepted at the server 30b.

2-1-2. Printing Operation

After a registration operation for a printing instruction is completed, a user moves to a place where the image processing apparatus 20 is installed, and issues, using the UI unit 205 of the image processing apparatus 20, an instruction to perform printing processing.

Figure 8:
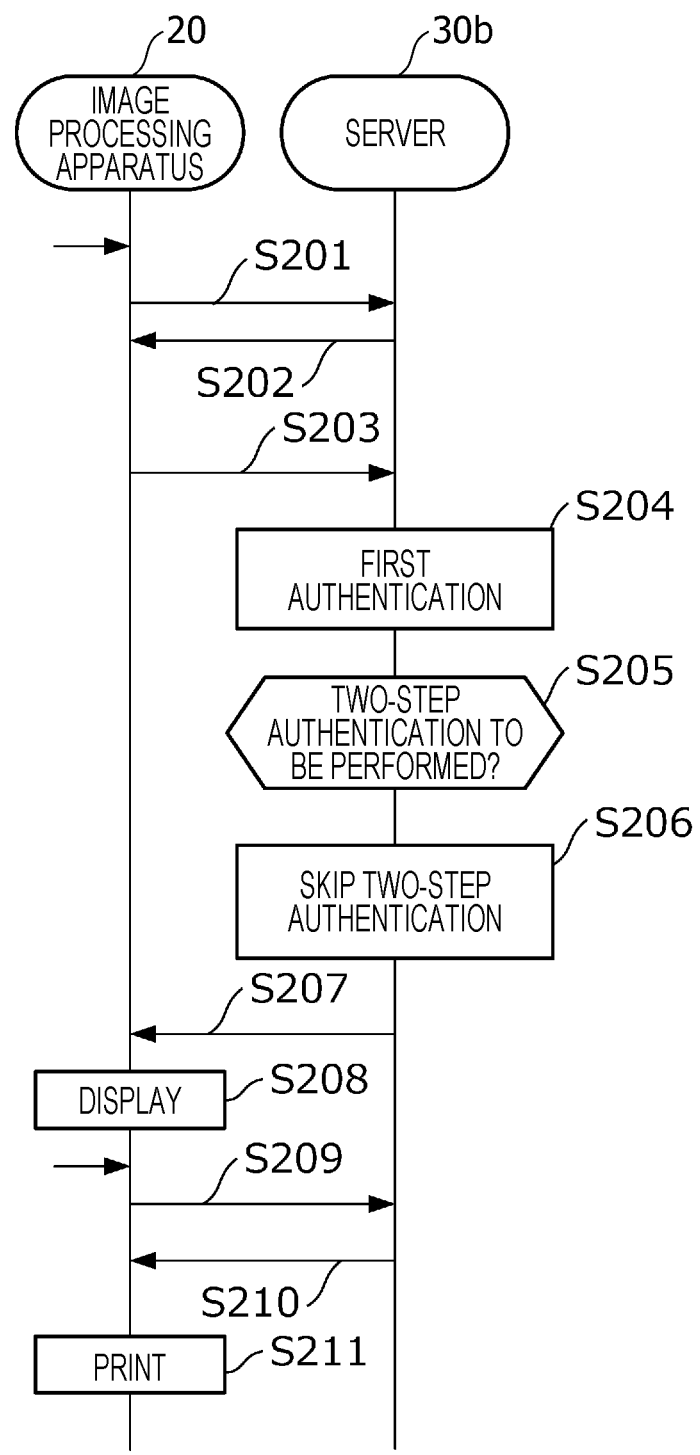
FIG. 8 is a sequence diagram illustrating an example of the flow of an operation of the information processing system.

FIG. 8 is a sequence diagram illustrating an example of the flow of a printing operation of the information processing system 1. In step S201, the image processing apparatus 20 transmits a request for a list of printing instructions to the server 30b. At this time, the image processing apparatus 20 includes, as an IP address to be included in the request, the IP address of the PC 10 in the request, in place of the IP address of the image processing apparatus 20. That is, in the case where data to be transmitted to a server includes the IP address of the image processing apparatus 20 (an example of second identification information), the image processing apparatus 20 transmits the IP address of the PC 10, in place of the IP address of the image processing apparatus 20, to the server 30b. As the address of the PC 10, an address stored in the storing device 203 of the image processing apparatus 20 is used (step S112 and the like of FIG. 7).

Based on an ID token input by a user, the image processing apparatus 20 acquires an IP address associated with the ID token from the storing device 203, and accesses the server 30a using the acquired IP address. That is, in the example of FIG. 8, at the server 30b, the request received from the image processing apparatus 20 is handled as a request transmitted from the PC 10 and relayed by the image processing apparatus 20, not as a request transmitted from the image processing apparatus 20.

In step S202, the server 30b transmits a response regarding request for user authentication to the image processing apparatus 20. Upon receiving the response, the image processing apparatus 20 displays a screen prompting input of authentication information on the UI unit 205 in accordance with the received response. The user inputs, using the UI unit 205, authentication information (for example, an ID token and a password).

In step S203, the image processing apparatus 20 transmits a request including the input authentication information to the server 30b. At this time, the image processing apparatus 20 reads the IP address of the PC 10 stored in association with the token input by the user from the storing device 203, and transmits the read IP address, in place of the IP address of the image processing apparatus 20, to the server 30b. In step S204, the server 30b performs user authentication using the authentication information included in the received request. The user authentication performed at this time is the first-step authentication of two-step authentication.

In the case where the first-step authentication is successfully completed, the server 30b determines whether or not to skip the second-step authentication of the two-step authentication in step S205. This determination is performed based on whether or not multiple continuous accesses have been made by a client terminal as an access source identified by the received request. This determination is similar to the determination performed after the first authentication in step S115 is done successfully.

In the example of FIG. 8, access to the server 30b by the image processing apparatus 20 is for the first time. However, the request transmitted to the server 30b from the image processing apparatus 20 includes the IP address of the PC 10, not the IP address of the image processing apparatus 20. Therefore, the server 30b determines that continuous accesses have been made by the PC 10, and skips the second authentication of the two-step authentication (step S206).

In step S207, the server 30b transmits a response including the list of printing instructions to the image processing apparatus 20. In step S208, the image processing apparatus 20 displays the list of printing instructions included in the response on the UI unit 205. The user performs, using the UI unit 205, an operation for specifying a printing instruction to be executed from the displayed list.

When the user specifies a printing instruction, the image processing apparatus 20 transmits a request including an instruction ID for identifying the specified printing instruction to the server 30b in step S209.

Upon receiving the request, the server 30b transmits printing data corresponding to the instruction ID included in the request to the image processing apparatus 20 in step S210. In step S211, the image processing apparatus 20 forms, using the received printing data, an image on a medium such as paper.

As described above, in this operation example, to the server 30b, the image processing apparatus 20 acts as if the image processing apparatus 20 were the PC 10. Accordingly, the server 30b determines that an access by the PC 10 and an access by the image processing apparatus 20 are two continuous accesses by the PC 10, and thus skips two-step authentication.

If the two-step authentication skip function is effective for the last access source for which authentication is successful and accesses are made by different sources, two-step authentication may not be skipped even for accesses from a single user. Furthermore, for example, a service is available in which measures such transmitting an alert mail are taken in the case where the current access source is different from the last one, even if the second authentication of two-step authentication is skipped. Therefore, in the case where an apparatus that issues a registration instruction for a printing instruction (for example, the PC 10) is different from an apparatus that issues an execution request for printing processing (for example, the image processing apparatus 20), the two-step authentication skip function is not effective even for operations by a single user, and two-step authentication is required to be performed for both the procedures.

In contrast, in this exemplary embodiment, one of a plurality of clients has a proxy function and a different client accesses a service via the client that has the proxy function. Therefore, the apparatuses act as if they were a single access source to the service to be provided. In the first operation example described above, the image processing apparatus 20 operates as a proxy, and the image processing apparatus 20 includes, at the time of transmitting data to the server 30*b*, the IP address of the PC 10, in place of the IP address of the image processing apparatus 20. Accordingly, processing load regarding two-step authentication for accesses by a single user may be reduced.

2-2. Second Operation Example (Case where PC 10 Operates as Proxy)

Next, another operation example in this exemplary embodiment will be explained. In the first operation example described above, the image processing apparatus 20 has a proxy function and relays communication between the PC 10 and the server 30. In contrast, in this operation example, the PC 10, not the image processing apparatus 20, has a proxy function and relays communication between the image processing apparatus 20 and the server 30. In this case, software for implementing the proxy function needs to be installed in advance in the PC 10.

In this operation example, the IP address of a client PC is registered in advance in association with a user ID in the storing device 203 of the image processing apparatus 20. This registration may be performed by user's operation on the UI unit 205 or user's operation on the PC 10 so that a registration request may be transmitted from the PC 10 to the image processing apparatus 20. At the time of relaying access to the server 30*b* by the image processing apparatus 20, the PC 10 includes the IP address of the PC 10 in the request, in place of the IP address of the image processing apparatus 20 included in the request to be relayed, and transmits the request including the IP address of the PC 10 to the server 30*b*.

2-2-1. Reception Operation for Printing Instructions

First, a user specifies, using the PC 10, the address of the Web UI of the server 30*a*, and makes a request for printing of a file registered in the server 30*a*.

Figure 9:
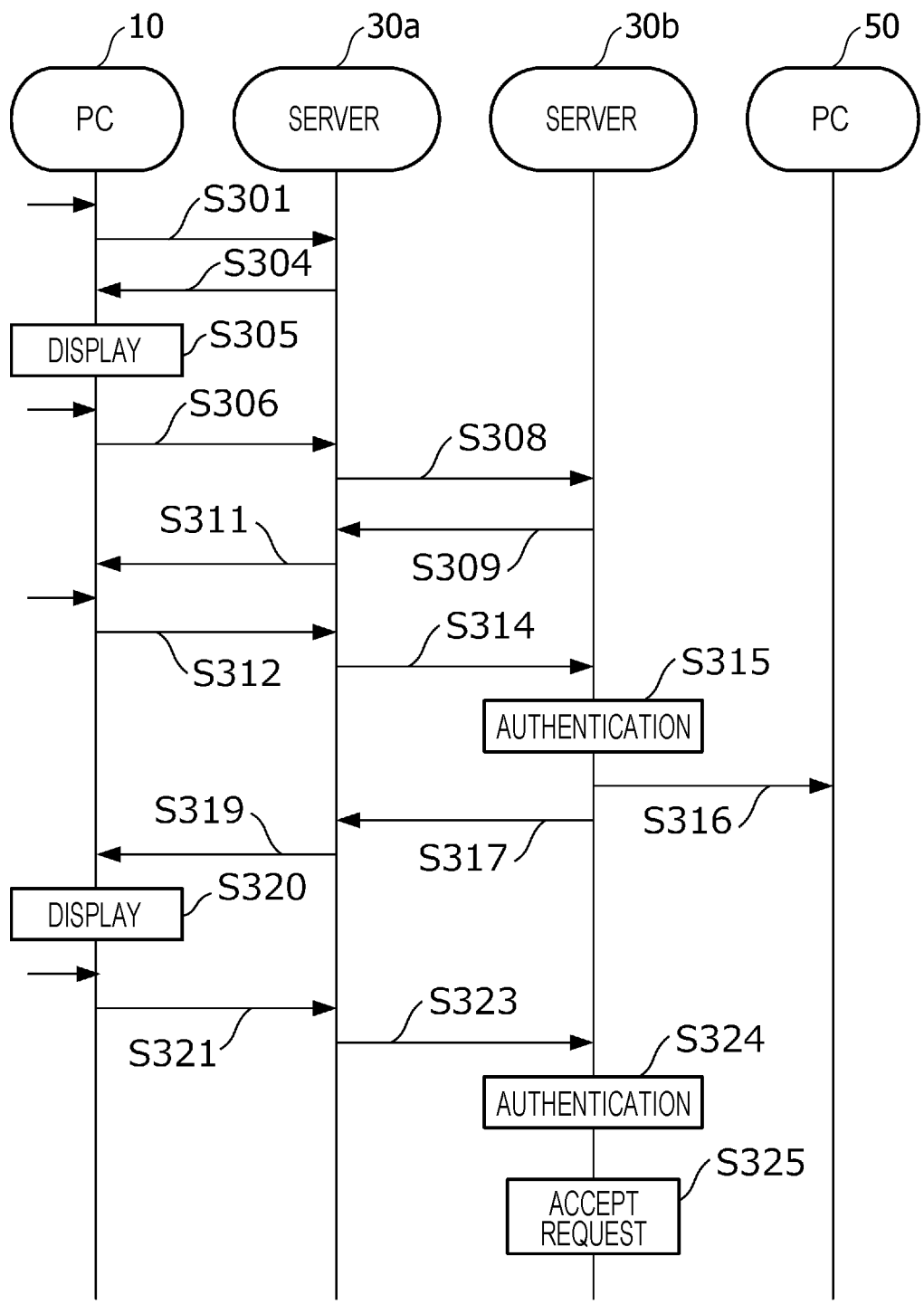
FIG. 9 is a sequence diagram illustrating an example of the flow of an operation of the information processing system.

FIG. 9 is a sequence diagram illustrating an example of the flow of an operation of the information processing system 1. In step S301, the PC 10 transmits a request to the server 30*a* using a specified address. This request includes the IP address of the PC 10 (an example of first identification information). In step S304, the server 30*a* transmits a response including a list of files specified by a URL to the PC 10.

In step S305, the PC 10 displays the received list of files on the UI unit 105. The user performs, using the UI unit 105, an operation for specifying a file to be printed from the displayed list. After the user specifies a file, the PC 10 transmits a printing request including a file ID for identifying the specified file to the server 30*a* in step S306.

In step S308, the server 30*a* transmits a printing request to the server 30*b*. Upon receiving the printing request from the server 30*a*, the server 30*b* transmits a response regarding request for authentication of a transmission source of the printing request to the server 30*a* in step S309. In step S311, the server 30*a* transmits a response regarding request for authentication of the PC 10 to the PC 10. Upon receiving the response via the image processing apparatus 20, the PC 10 displays a screen prompting input of authentication information on the UI unit 105 in accordance with the received response. The user inputs, using the UI unit 105, authentication information (for example, an ID token and a password).

In steps S312 and 314, the PC 10 transmits a request including the input authentication information to the server 30*b* via the server 30*a*. In step S315, the server 30*b* performs user authentication using the authentication information included in the received request. The user authentication performed at this time is the first-step authentication of two-step authentication.

In the case where the first-step authentication is successfully completed, the server 30*b* determines whether or not to skip second-step authentication of the two-step authentication. A method for determining whether or not to skip the second-step authentication is similar to the method mentioned in step S115 of FIG. 7 in the first operation example described above. In the example of FIG. 9, access to the server 30*b* by the PC 10 is for the first time (not continuous accesses), and it is thus determined that the second-step authentication of the two-step authentication needs to be performed. Therefore, the server 30*b* performs processing for the second authentication of the two-step authentication. That is, in step S316, the server 30*b* transmits a message (for example, an SMS) including security code required for the two-step authentication to an address associated with the user ID. The transmitted message is received by the PC 50.

Furthermore, in steps S317 and S319, the server 30*b* transmits a response regarding request for two-step authentication to the PC 10 via the server 30*a*. Upon receiving the response, the PC 10 displays a screen prompting input of security code on the UI unit 105 in accordance with the received response in step S320. The user inputs, using the UI unit 105 of the PC 10, the security code displayed on the UI unit of the PC 50.

After the security code is input, the PC 10 transmits a request including the input security code to the server 30*b* via the server 30*a* in steps S321 and S323. Upon receiving the request, the server 30*b* performs the second-step user authentication using the security code included in the received request in step S324. In the case where user authentication is successfully completed, the server 30*b* accepts the printing request received in step S308 and adds the received printing request to a processing list in step S325. As described above, two-step authentication is performed at the server 30*b*, and the printing instruction is accepted at the server 30*b*.

2-2-2. Printing Operation

After a registration operation for a printing instruction is completed, a user moves to a place where the image processing apparatus 20 is installed, and issues, using the UI unit 205 of the image processing apparatus 20, an instruction to perform printing processing.

Figure 10:
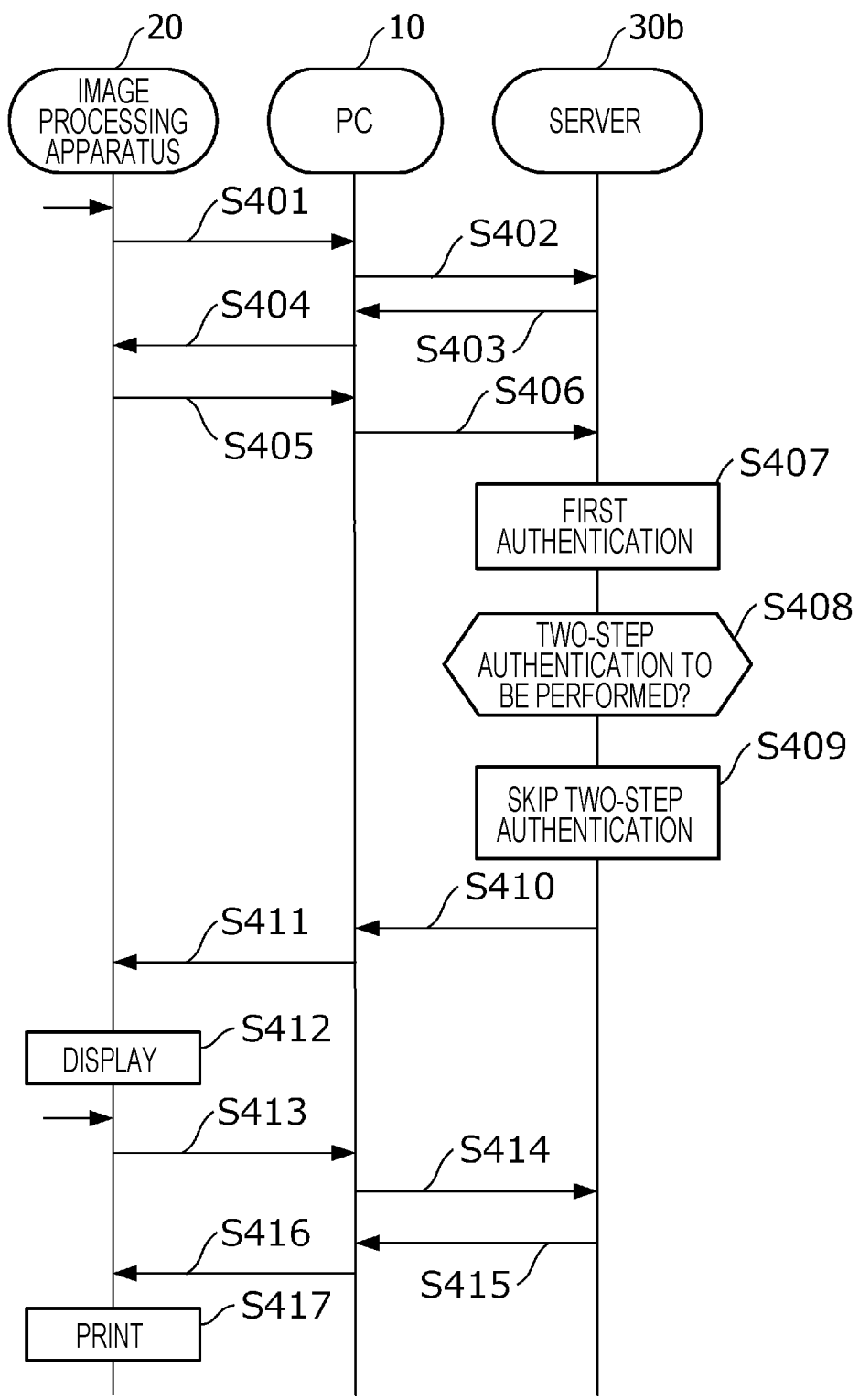
FIG. 10 is a sequence diagram illustrating an example of the flow of an operation of the information processing system.

FIG. 10 is a sequence diagram illustrating an example of the flow of a printing operation of the information processing system 1. In step S401, the image processing apparatus 20 transmits a request for a list of printing instructions to the server 30*b* via the PC 10. In step S402, the PC 10 includes the IP address of the PC 10 in the request, in place of the IP address of the image processing apparatus 20 included in the request from the image processing apparatus 20, and transmits the request including the IP address of the PC 10 to the server 30*b*. That is, in the case where a pair of an ID token and an IP address included in a request to be relayed is stored in the PC 10, the PC 10 includes the IP address of the PC 10 in the request, in place of the IP address of the image processing apparatus 20 included in the request, and transfers the request including the IP address of the PC 10.

Furthermore, at the time of relaying communication between the image processing apparatus 20 and the server 30b, the PC 10 performs processing for replacing SSL connection for a specific URL (the URL of the server 30a or the server 30b).

That is, in this operation example, at the server 30b, the request transmitted from the image processing apparatus 20 is handled as a request transmitted from the PC 10, not from the image processing apparatus 20.

In steps S403 and S404, the server 30b transmits a response regarding request for user authentication to the image processing apparatus 20 via the PC 10. The PC 10 relays communication between the image processing apparatus 20 and the server 30b. At this time, the PC 10 includes the IP address of the PC 10 in the response, in place of the IP address of the image processing apparatus 20 included in the response, and transfers the response including the IP address of the PC 10.

Upon receiving the response, the image processing apparatus 20 displays a screen prompting input of authentication information on the UI unit 105 in accordance with the received response. The user inputs, using the UI unit 205, authentication information (for example, an ID token).

In steps S405 and S406, the image processing apparatus 20 transmits a request including the input authentication information to the server 30b via the PC 10 in steps S405 and S406. At the time of relaying, the PC 10 includes the IP address of the PC 10 in the response, in place of the IP address of the image processing apparatus 20 included in the response, and transfers the response including the IP address of the PC 10.

In step S407, the server 30b performs user authentication using the authentication information included in the received request. The user authentication performed at this time is the first authentication of the two-step authentication.

In the case where the first-step authentication is successfully completed, the server 30b determines whether or not to skip the second-step authentication of the two-step authentication (step S408). This determination is performed based on whether or not multiple continuous accesses have been made by a client terminal as an access source identified by the received request. This determination is similar to the determination performed after the first authentication is successfully done in step S115 of FIG. 7.

In the example of FIG. 10, access to the server 30b by the image processing apparatus 20 is for the first time. However, the request transmitted from the image processing apparatus 20 to the server 30b includes the IP address of the PC 10, not the IP address of the image processing apparatus 20. Therefore, the server 30b determines that continuous accesses have been made by the PC 10, and skips the second authentication of the two-step authentication (step S409).

In steps S410 and S411, the server 30b transmits a response including the list of printing instructions to the image processing apparatus 20 via the PC 10. In step S412, the image processing apparatus 20 displays the list of printing instructions included in the response on the UI unit 205. The user performs, using the UI unit 205, an operation for specifying a printing instruction to be executed from the displayed list.

When the user specifies a printing instruction, the image processing apparatus 20 transmits a request including an instruction ID for identifying the specified printing instruction to the server 30b via the PC 10 in steps S413 and S414.

Upon receiving the request, the server 30b transmits printing data corresponding to the instruction ID included in the request to the image processing apparatus 20 via the PC 10 in steps S415 and S416. In step S417, the image processing apparatus 20 forms, using the received printing data, an image on a medium such as paper.

In this operation example, the PC 10 replaces the IP address included in the request transmitted from the image processing apparatus 20 with the IP address of the PC 10, and thus acts as if access to the server 30b by the image processing apparatus 20 being relayed by the PC 10 were access by the PC 10. Accordingly, the server 30b determines that an access by the image processing apparatus 20 is the second access continuously made by the PC 10, and thus skips two-step authentication. Consequently, processing load regarding two-step authentication for accesses by a single user may be reduced.

3. Modifications

The foregoing exemplary embodiment is merely an example of the present disclosure and may be modified as described below. Furthermore, the foregoing exemplary embodiment and modifications described below may be combined according to need.

(1) In the foregoing exemplary embodiment, an IP address is used as identification information for identifying a client terminal (the PC 10, the image processing apparatus 20, or the like). However, identification information for identifying a client terminal may be information different from an IP address. For example, as identification information for identifying a client terminal, a media access control (MAC) address may be used. Furthermore, as identification information for identifying a client terminal, for example, "X-Real-IP" or "X-Forwarded-For" of a hypertext transfer protocol (HTTP) header, "RemoteAddr", or the like may be used. In this case, for example, the image processing apparatus 20 sets the IP address of the PC 10, not the IP address of the image processing apparatus 20, for the "X-Real-IP" and performs communication. Furthermore, such a plurality of pieces of identification information may be used together.

(2) In the foregoing exemplary embodiment, when security code is transmitted to the PC 50 and a user inputs the code displayed at the PC 50 onto a screen of the PC 10, the second authentication of two-step authentication is performed. The client terminal that receives the security code may be of any type, such as, for example, a smartphone, a laptop computer, or the like. Furthermore, a method for two-step authentication is not limited to the method described in the foregoing exemplary embodiment. For example, the second authentication may be performed by transmitting electronic mail describing a URL for accessing a specific Web page and accessing the URL by a user operation.

(3) The case where a cloud printing service is provided by the server 30 has been explained in the foregoing exemplary embodiment. However, a service to be provided by a server is not limited to that explained in the foregoing exemplary embodiment. For example, a storage service or a moving image distribution service may be provided by a server.

(4) In the foregoing exemplary embodiment, an ID token and the IP address of the PC 10 are stored in association with each other in the storing device 203. Information stored in the storing device 203 is not limited to those described in the foregoing exemplary embodiment as long as identification information (first identification information) for identifying the PC 10 is stored in association with information regarding the PC 10 or information regarding a user of the PC 10. Information regarding a user of the PC 10 may be, for example, a user ID for identifying the user.

(5) In the foregoing exemplary embodiment, at the time relaying communication between the PC 10 and the server 30, the image processing apparatus 20 stores an ID token and an IP address included in a request transmitted from the PC 10 to the server 30 in association with each other in the storing device 203 (step S112 and the like of FIG. 7). The timing at which the IP address of the PC 10 and the ID token for identifying a user are stored in association with each other in the storing device 203 is not limited to the timing described above in the foregoing exemplary embodiment. For example, prior to relay processing by the image processing apparatus 20, the PC 10 may access the image processing apparatus 20, and the image processing apparatus 20 may detect the IP address of the PC 10 and register the detected IP address in the storing device 203. Furthermore, for example, at the timings of steps S101, S106, and the like of FIG. 7 at which the PC 10 accesses the server 30a via the image processing apparatus 20, the image processing apparatus 20 may store an ID token and an IP address of an access source, which are flowing in a communication path, in association with each other in the storing device 203.

(6) In the foregoing exemplary embodiment, a program executed by the processor 101 of the PC 10, the processor 201 of the image processing apparatus 20, or the processor 301 of the server 30 may be downloaded via a communication line such as the Internet. Furthermore, such a program may be recorded in a computer-readable recording medium such as a magnetic recording medium (a magnetic tape, a magnetic disk, or the like), an optical recording medium (an optical disc or the like), a magneto-optical recording medium, or a semiconductor and provided.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A terminal comprising:
a memory that stores first identification information for identifying a different terminal; and
a processor, coupled to the memory, wherein the processor is configured to:
relay communication between the different terminal and a server that requires two-step authentication at a time of providing a service; and
access the server, and transmit, in a case where data to be transmitted to the server includes second identification information for identifying the terminal, the first identification information, in place of the second identification information included in the data, to the server,
wherein the first identification information and the second identification information each include at least one of a media access control address, an Internet protocol address, and a hypertext transfer protocol header,
wherein the memory stores the first identification information in association with information regarding the different terminal or a user of the different terminal, and
wherein the processor is further configured to:
transmit first identification information corresponding to information acquired when accessing the server, in place of the second identification information, to the server;
store a token received from the different terminal in the communication being relayed, in association with the first identification information of the different terminal, in the memory; and
read first identification information corresponding to a token used in access to the server from the memory, and transmits the read first identification information, in place of the second identification information, to the server.

2. The terminal according to claim 1, wherein the processor is further configured to replace secure sockets layer connection regarding connection with the server.

3. A terminal comprising:
a memory; and
a processor, coupled to the memory, wherein the processor is configured to:
a server that requires two-step authentication at a time of providing a service; and
relay communication between a different terminal and the server, and transmit, in a case where data received from the different terminal includes first identification information for identifying the different terminal, second identification information for identifying the terminal, in place of the first identification information included in the data, to the server,
wherein the memory stores the first identification information in association with information regarding the different terminal or a user of the different terminal, and
wherein the processor is further configured to:
transmit first identification information corresponding to information acquired when accessing the server, in place of the second identification information, to the server;
store a token received from the different terminal in the communication being relayed, in association with the first identification information of the different terminal, in the memory; and
read first identification information corresponding to a token used in access to the server from the memory, and transmits the read first identification information, in place of the second identification information, to the server.

4. A non-transitory computer readable medium storing a program causing a computer including a memory that stores first identification information for identifying a different terminal to execute a process comprising:
relaying communication between the different terminal and a server that requires two-step authentication at a time of providing a service;
transmitting, in a case where data to be transmitted to the server includes second identification information for identifying the computer, the first identification information, in place of the second identification information included in the data, to the server;
storing the first identification information in association with information regarding the different terminal or a user of the different terminal;
transmitting first identification information corresponding to information acquired when accessing the server, in place of the second identification information, to the server;

storing a token received from the different terminal in the communication being relayed, in association with the first identification information of the different terminal, in the memory; and reading first identification information corresponding to a token used in access to the server from the memory, and transmits the read first identification information, in place of the second identification information, wherein the first identification information and the second identification information each include at least one of a media access control address, an Internet protocol address, and a hypertext transfer protocol header.

5. A non-transitory computer readable medium storing a program causing a computer to execute a process comprising:

accessing a server that requires two-step authentication at a time of providing a service; and relaying communication between a different terminal and the server, and transmitting, in a case where data received from the different terminal includes first identification information for identifying the different terminal, second identification information for identifying the computer, in place of the first identification information included in the data, to the server;

storing the first identification information in association with information regarding the different terminal or a user of the different terminal;

transmitting first identification information corresponding to information acquired when accessing the server, in place of the second identification information, to the server;

storing a token received from the different terminal in the communication being relayed, in association with the first identification information of the different terminal, in the memory; and reading first identification information corresponding to a token used in access to the server from the memory, and transmits the read first identification information, in place of the second identification information, wherein the first identification information and the second identification information each include at least one of a media access control address, an Internet protocol address, and a hypertext transfer protocol header.

* * * * *